United States Patent [19]
Asselin et al.

[11] Patent Number: 5,736,704
[45] Date of Patent: Apr. 7, 1998

[54] CIRCUIT-BREAKER WITH GROUNDED METAL ENCLOSURE

[75] Inventors: Luc Asselin; Olivier Rouilhac, both of Lyons, France

[73] Assignee: GEC Alsthom T & D SA, Paris, France

[21] Appl. No.: 797,664

[22] Filed: Jan. 31, 1997

[30] Foreign Application Priority Data

Feb. 2, 1996 [FR] France .................. 96 01280

[51] Int. Cl.⁶ ............................................ H01H 33/70
[52] U.S. Cl. ................................. 218/68; 218/155
[58] Field of Search ......................... 218/1, 2, 7, 8, 218/11–13, 43, 46, 55, 56, 57, 68, 69, 71, 75, 76, 78, 79, 80, 82, 84, 152–155

[56] References Cited

U.S. PATENT DOCUMENTS

| | | | |
|---|---|---|---|
| 3,118,966 | 1/1964 | Yeckley et al. | 174/18 |
| 3,214,551 | 10/1965 | Taylor | 200/148 |
| 3,786,216 | 1/1974 | Beier et al. | 200/148 D |
| 3,796,504 | 3/1974 | Marechal | 403/288 |
| 4,045,634 | 8/1977 | Nakano et al. | 200/148 B |
| 4,236,053 | 11/1980 | Sasaki et al. | 200/144 R |
| 4,516,006 | 5/1985 | Kobayashi et al. | 200/148 A |
| 5,495,084 | 2/1996 | Meyer et al. | 218/43 |

FOREIGN PATENT DOCUMENTS

| | | | |
|---|---|---|---|
| 54-68945 | 6/1979 | Japan | H02B 13/06 |
| 1573713 | 8/1980 | United Kingdom | H01H 33/02 |

*Primary Examiner*—Cassandra C. Spyrou
*Assistant Examiner*—Michael A. Friedhofer
*Attorney, Agent, or Firm*—Sughrue, Mion, Zinn, Macpeak & Seas, PLLC

[57] ABSTRACT

A grounded metal enclosure circuit-breaker comprises, for each pole, a metal enclosure having two insulative bushings. The enclosure and the bushings are adapted to be filled with insulative gas. The enclosure contains first and second metal supports and a set of fixed contacts and a set of mobile contacts respectively supported by the first and second metal supports. The bushings each comprise a metal conductor surrounded by an insulative covering, each of the first and second metal supports having fixed to it a metal part having an annular portion surmounted by a deformable conical portion. The metal part has an axial bore in which the bushing conductor is inserted. A ring having a conical interior surface complementary to that of the conical portion is screwed onto the annular portion.

4 Claims, 4 Drawing Sheets

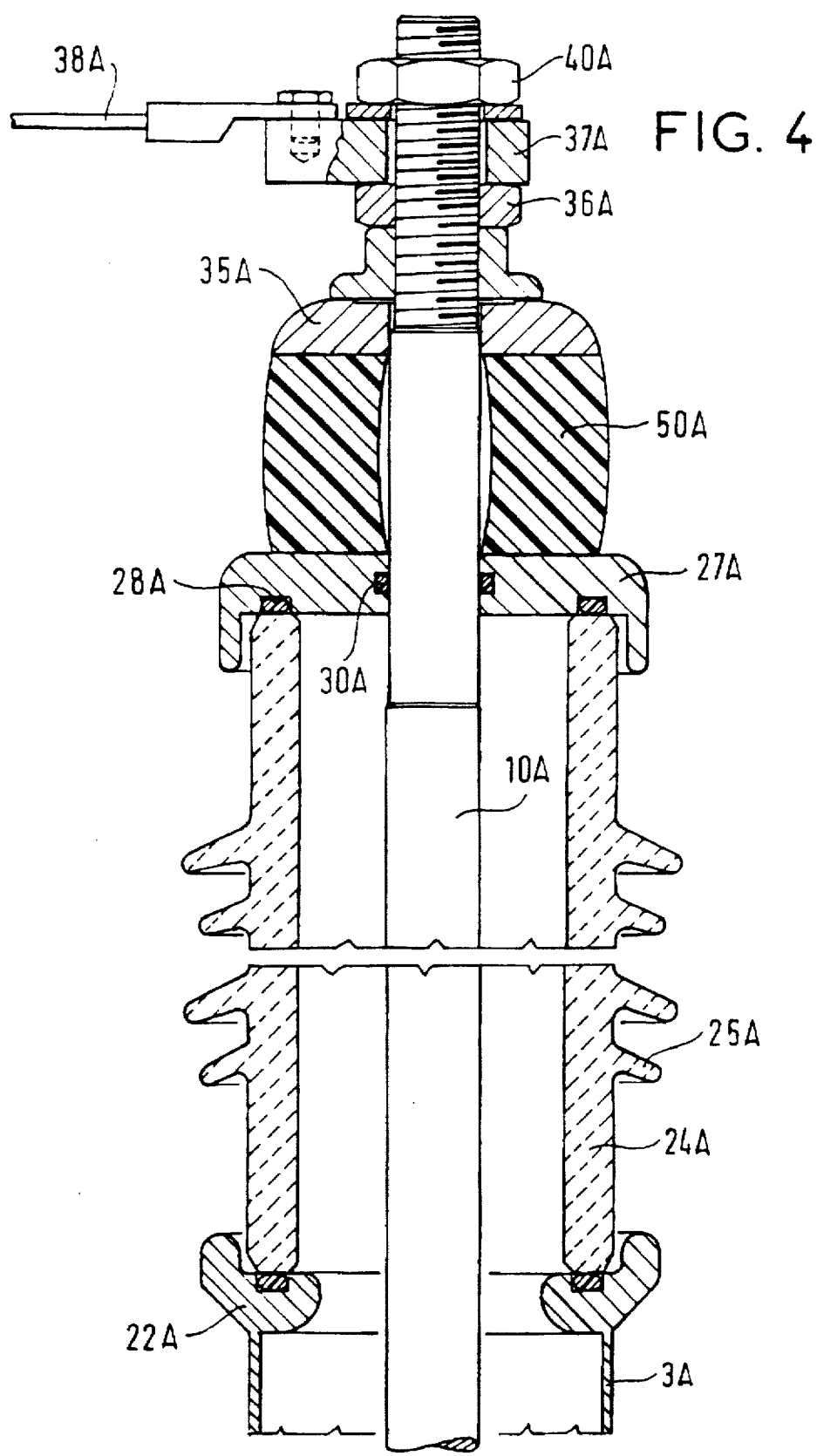

CIRCUIT-BREAKER WITH GROUNDED METAL ENCLOSURE

BACKGROUND OF THE INVENTION

1. Field of the Invention

The present invention concerns a circuit-breaker with a grounded metal enclosure, also known as a "dead tank" circuit-breaker.

2. Description of the Prior Art

A circuit-breaker of this kind comprises, for each pole, a sealed metal enclosure filled with an insulative gas such as sulfur hexafluoride SF6 at a pressure of a few bars.

The pole comprises two gas-tight insulative bushings respectively connected, inside the enclosure, to fixed contacts and to mobile contacts. The latter are actuated by a rod passing through the enclosure in a gastight manner and connected, outside the enclosure, to an operating mechanism.

A first technical problem to be solved is as follows: in equipment of the above type, the current generally enters and leaves via bars. These bars must be connected to respective interrupter devices in the simplest possible manner with minimal contact resistance, at the lowest possible cost and with provision for mounting and demounting.

Another problem arises in connection with the bushings of "dead tank" units; these bushings comprise a metal bar surrounded by a ceramic or epoxy insulative covering; in one embodiment the covering is compressed by an assembly of parts fixed to the bar. The bar carries the current. Because of the different coefficients of thermal expansion of the materials of the covering and the bar, it is necessary to provide a system for regulating the compression force on the covering resulting from a change of temperature. One known way to solve this problem is to apply compression to the covering by means of spring members such as coil springs, spring washers, etc. These metal members are the site of Eddy currents that cause unacceptable increases in temperature if the current in the bar is high.

The above technical problems are solved by the invention as explained hereinafter.

SUMMARY OF THE INVENTION

The invention consists in a grounded metal enclosure circuit-breaker comprising, for each pole, a metal enclosure having two insulative bushings, said enclosure and said bushings being adapted to be filled with insulative gas, said enclosure containing first and second metal supports and a set of fixed contacts and a set of mobile contacts respectively supported by said first and second metal supports, said bushings each comprising a metal conductor surrounded by an insulative covering, each of said first and second metal supports having fixed to it a metal part having an annular portion surmounted by a deformable conical portion, said metal part having an axial bore in it into which said bushing conductor is inserted, a ring having a conical interior surface complementary to that of said conical portion being screwed onto said annular portion.

The invention will be clearly understood from a reading of the following description of one embodiment of the invention given with reference to the accompanying drawings.

BRIEF DESCRIPTION OF THE DRAWINGS

FIG. 4 an elevation view of part of a bushing with a compensation member in accordance with the invention.

DETAILED DESCRIPTION OF THE PREFERRED EMBODIMENT

Figure 1:
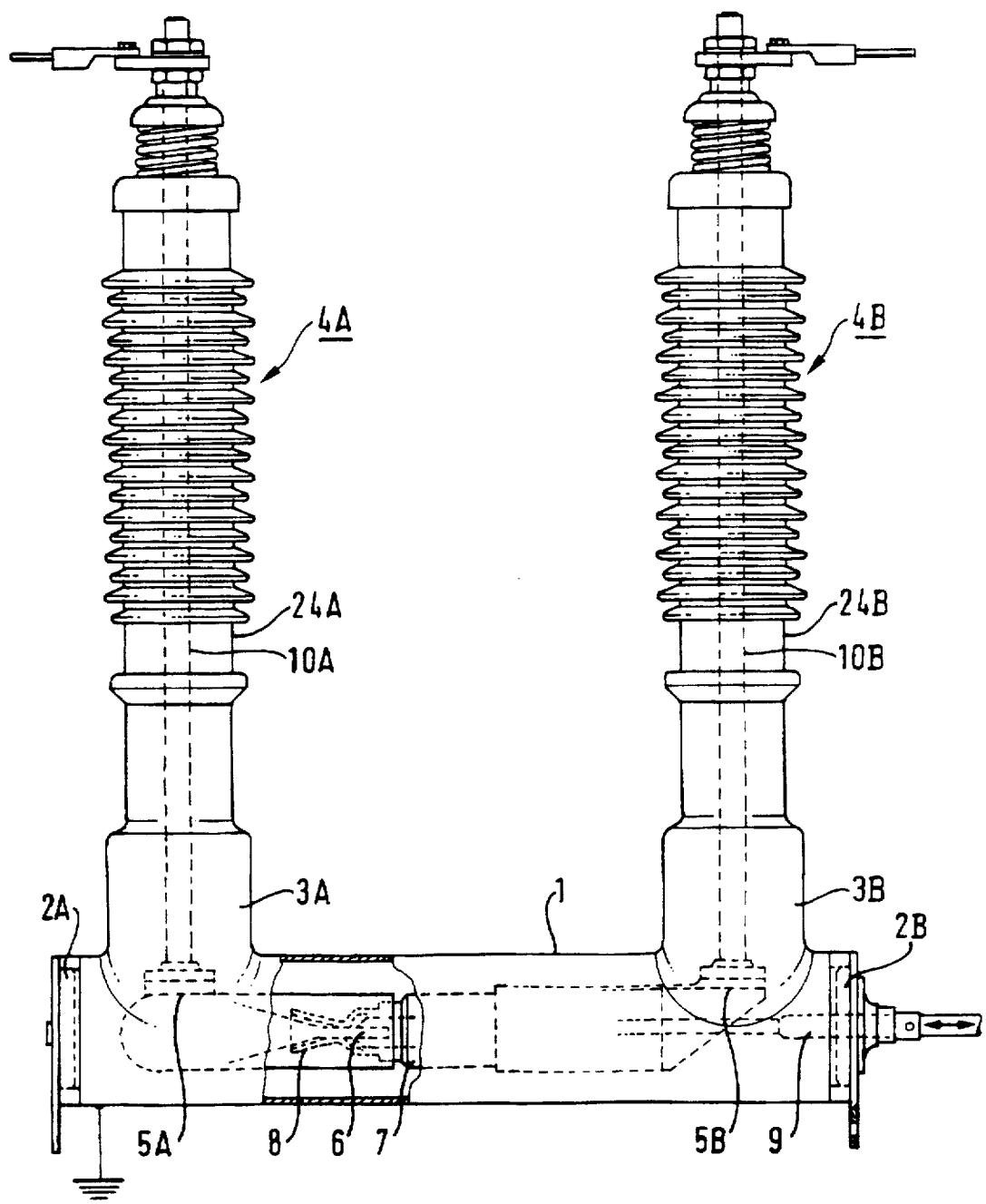
FIG. 1 is an elevation view of one pole of a circuit-breaker with a grounded metal enclosure.

FIG. 1 is a diagrammatic elevation view of one pole of one embodiment of a grounded metal enclosure circuit-breaker. The enclosure comprises a cylindrical metal casing 1 with two end flanges 2A and 2B. Each end of the casing is provided with respective circular chambers 3A, 3B supporting respective insulative electrical bushings 4A, 4B.

Inside the metal enclosure 1A–1B is the interrupter chamber comprising two fixed cylindrical parts 5A and 5B which receive the current from the bushings 4A and 4B, respectively, and support the contact parts of the circuit-breaker. These parts are well known in themselves and as they do not in themselves form any part of the present invention they are merely indicated in dashed outline: it is nevertheless possible to make out the fixed contact 6 cooperating with the mobile contact 7 and the puffer nozzle 8. An operating rod 9 connected to an operating mechanism that is not shown passes in a gas-tight manner through the flange 2B.

Figure 2:
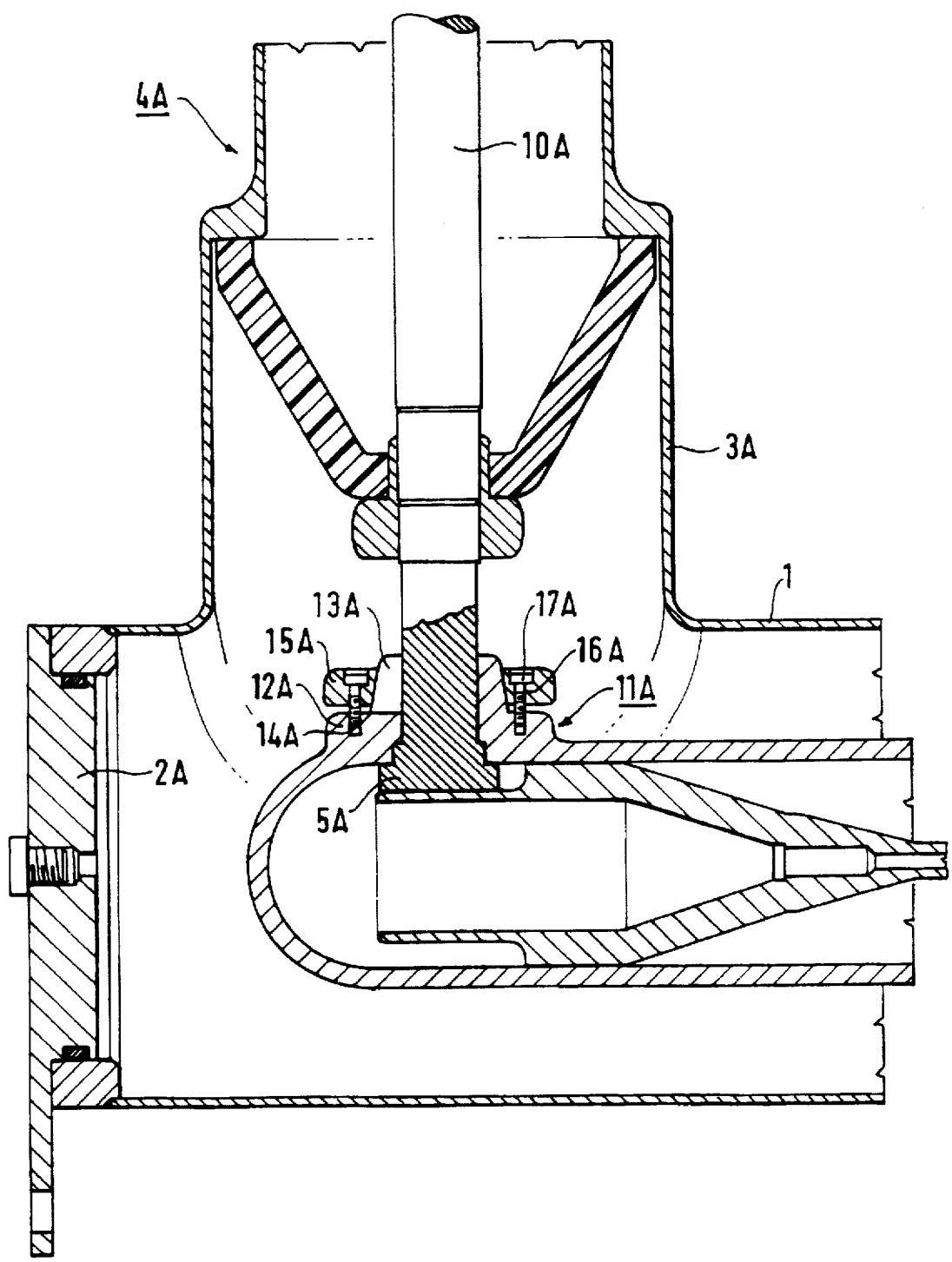
FIG. 2 is a view to a larger scale showing how the connection between the bushing conductors and the interrupter chamber is made in a circuit-breaker in accordance with the invention.

Turn now to FIG. 2, which shows in detail how the conductor of the bushing 4A is fixed to the cylinder 5A carrying the fixed contacts.

The conductor of the bushing 4A is a metal rod 10A. The cylinder 5A includes a metal part 11A having an annular portion 12A surmounted by a deformable conical portion 13A; these portions have a central hole the diameter of which is similar to that of the rod 10A. The metal part 11A is preferably cast in one piece with the casing 1, but may instead be a separate part welded on. The annular portion 12A includes blind screwthreaded holes 14A regularly distributed around the central hole. The conical part is rendered deformable by slots in axial planes in the conical part 13A, for example.

The metal rod 10A is engaged in the support part 11A.

A ring 15A with a conical inside surface is fitted around the rod 10A. This ring has peripheral holes in it the number and distribution of which are such that they line up with the screwthreaded holes 14A in the annular portion 12A.

By inserting screws 17A in the bores 14A and 16A and screwing them in the ring 15A is caused to move towards the annular portion 12A, deforming the conical portion 13A. This deformation clamps the conical part 13A around the rod 10A.

Note that the rod 10B is fixed to the cylinder 5B in exactly the same manner as just described.

The clamping forces between the rods and the conical portions are very high, with the result that the electrical contact resistances are low; the active parts of the interrupter chamber can therefore be suspended from the rods, which saves the cost of other support parts. The assembly is very simple with the result that adjustments, in particular that of the orientation of the interrupter parts within the casing, are facilitated.

Figure 3:
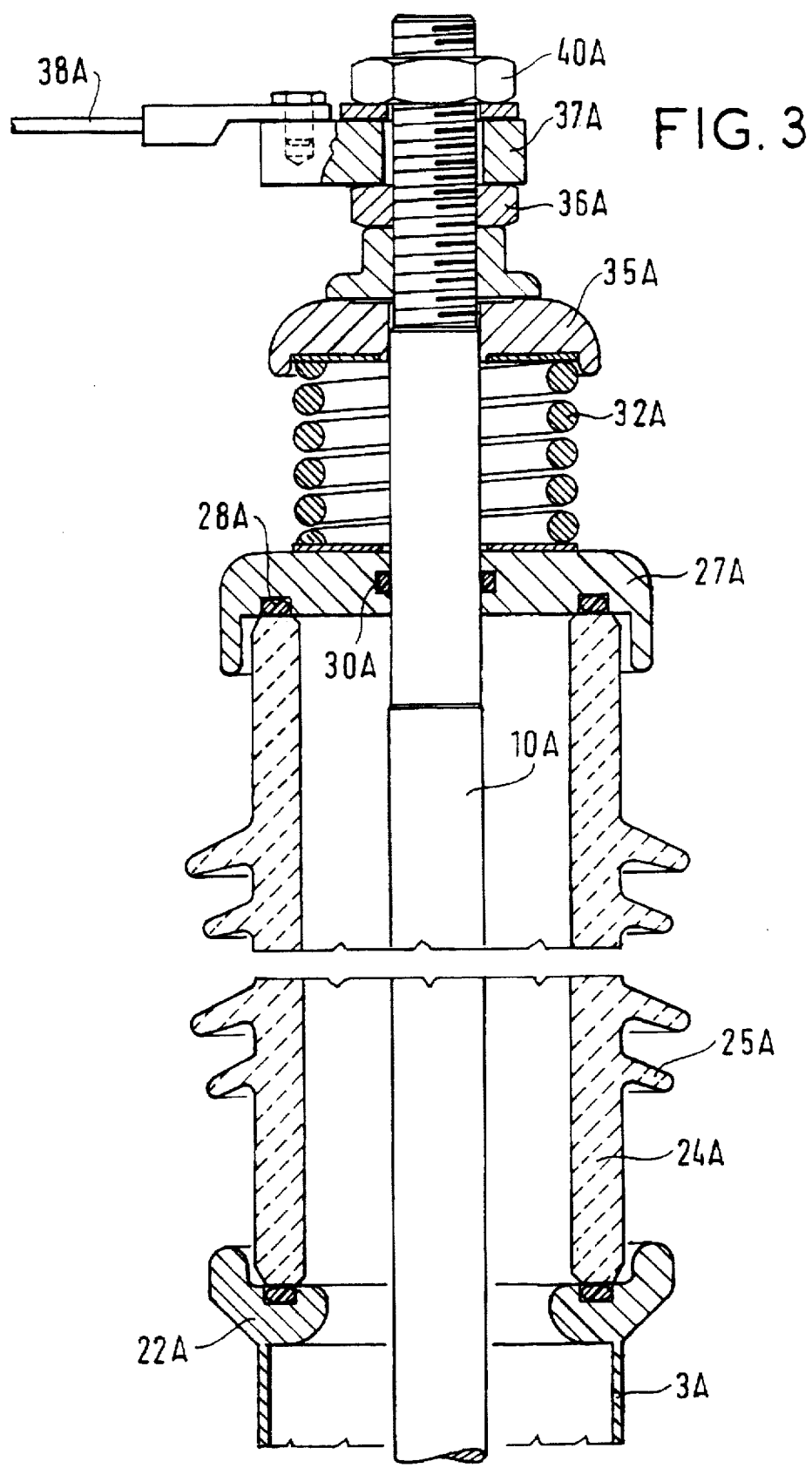
FIG. 3 is an elevation view of pare of a bushing with a prior art compensation member.

FIG. 3 shows the construction of a bushing. The bushing 4A is shown by way of example; the bushing 4B is identical and the like components are identified by the same reference number except with the suffix B.

The bushing 4A is filled with insulative gas.

The end of the circular chamber 3A is terminated by a flange 22A having a flat annular part. An insulative, for example ceramic or composite material, column 24A with fins 25A bears on this flat annular part, to which it is sealed by a seal 23A. The top end of the insulative column is fitted with a metal cap 27A which is sealed to it by a seal 28A. The rod 10A passes through the cap 27A, to which it is sealed by a seal 30A. The column 24A is pressed onto the flange 21A by a spring 32A compressed between the cap 27A and a cover 35A clamped by a nut 36A screwed onto the screwthreaded end of the rod 10A.

FIG. 3 also shows the terminal 37A connected to a conductor 38A and retained by a nut 40A.

The springs provide sufficient pressure in the event of differential thermal expansion between the rod 10A and the insulative column 24A.

The metal spring may be the site of Eddy currents due to the alternating magnetic field generated by the passage of the current in the rod 10A.

For this reason, in accordance with the invention, and as shown in FIG. 4, the spring 32A is replaced by an elastomer block 50A. The elastomer preferably has a Young's modulus that is constant over a wide range of temperatures, for example from −50° C. to +100° C. The elastomer should also have low creep.

This eliminates the Eddy currents and the resulting heating. The cost of the part is low and fitting it requires fewer parts than in the prior art; this results in a significant saving in terms of procurement and labor.

The invention applies to the manufacture of grounded metal enclosure type circuit-breakers for voltages in ranges from 40 kV to 800 kV.

There is claimed:

1. A grounded metal enclosure circuit-breaker comprising, for each pole, a metal enclosure having two insulative bushings, said enclosure and said bushings filled with insulative gas, said enclosure containing first and second metal supports and a set of fixed contacts and a set of mobile contacts respectively supported by said first and second metal supports, said bushings each comprising a metal conductor surrounded by an insulative covering, each of said first and second metal supports having fixed to it a metal part having an annular portion surmounted by a deformable conical portion, said metal part having an axial bore into which said bushing conductor is inserted, a ring having a conical interior surface complementary to that of said conical portion being screwed onto said annular portion.

2. The circuit-breaker claimed in claim 1 wherein said annular portion comprises blind screwthreaded holes and said ring comprises the same number of holes in the same arrangement as said blind screwthreaded holes, said ring being screwed on by means of bolts.

3. The circuit-breaker claimed in claim 1 wherein said conical portion is rendered deformable by slots in radial planes.

4. The circuit-breaker claimed in claim 1 wherein said insulative bushings are compressed by elastomer members.

* * * * *